April 24, 1934.  P. B. GOODALE  1,956,096
WEIGHING DEVICE FOR VEHICLES
Filed Aug. 10, 1929   2 Sheets-Sheet 1
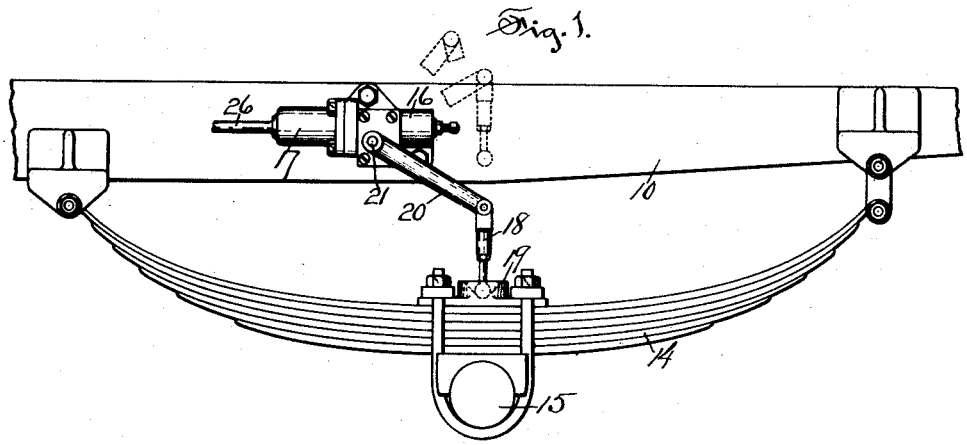
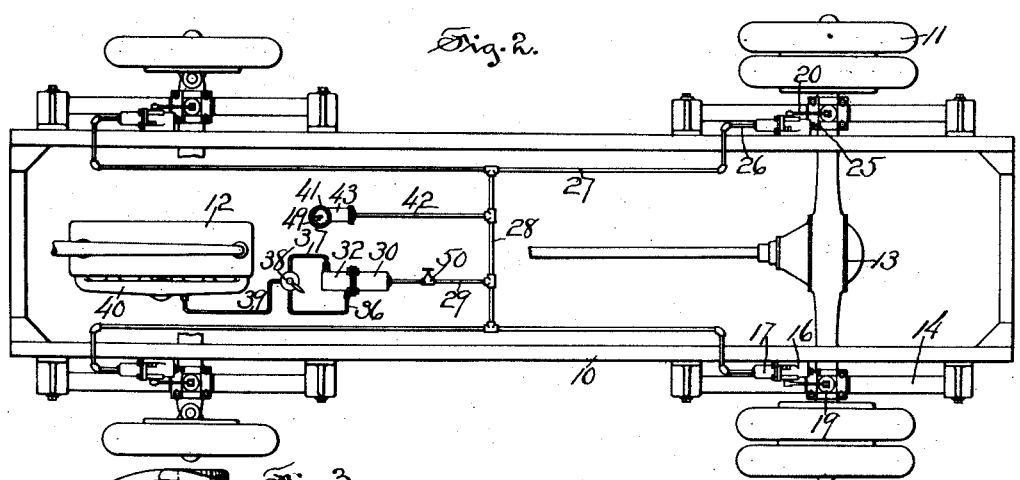
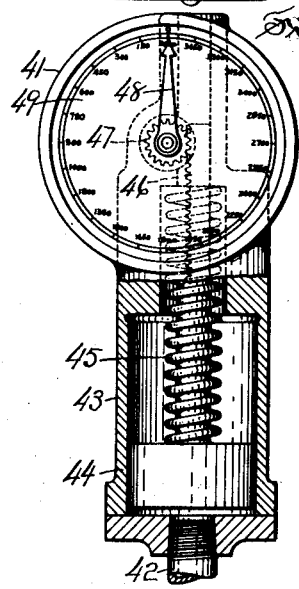
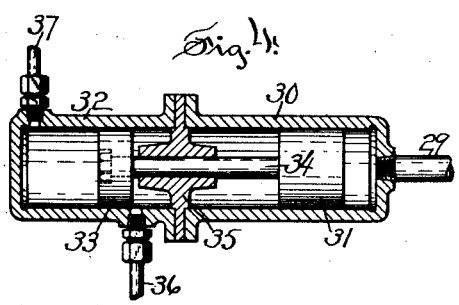
INVENTOR
Percy B. Goodale,
by
Arthur B. Jenkins,
ATTORNEY

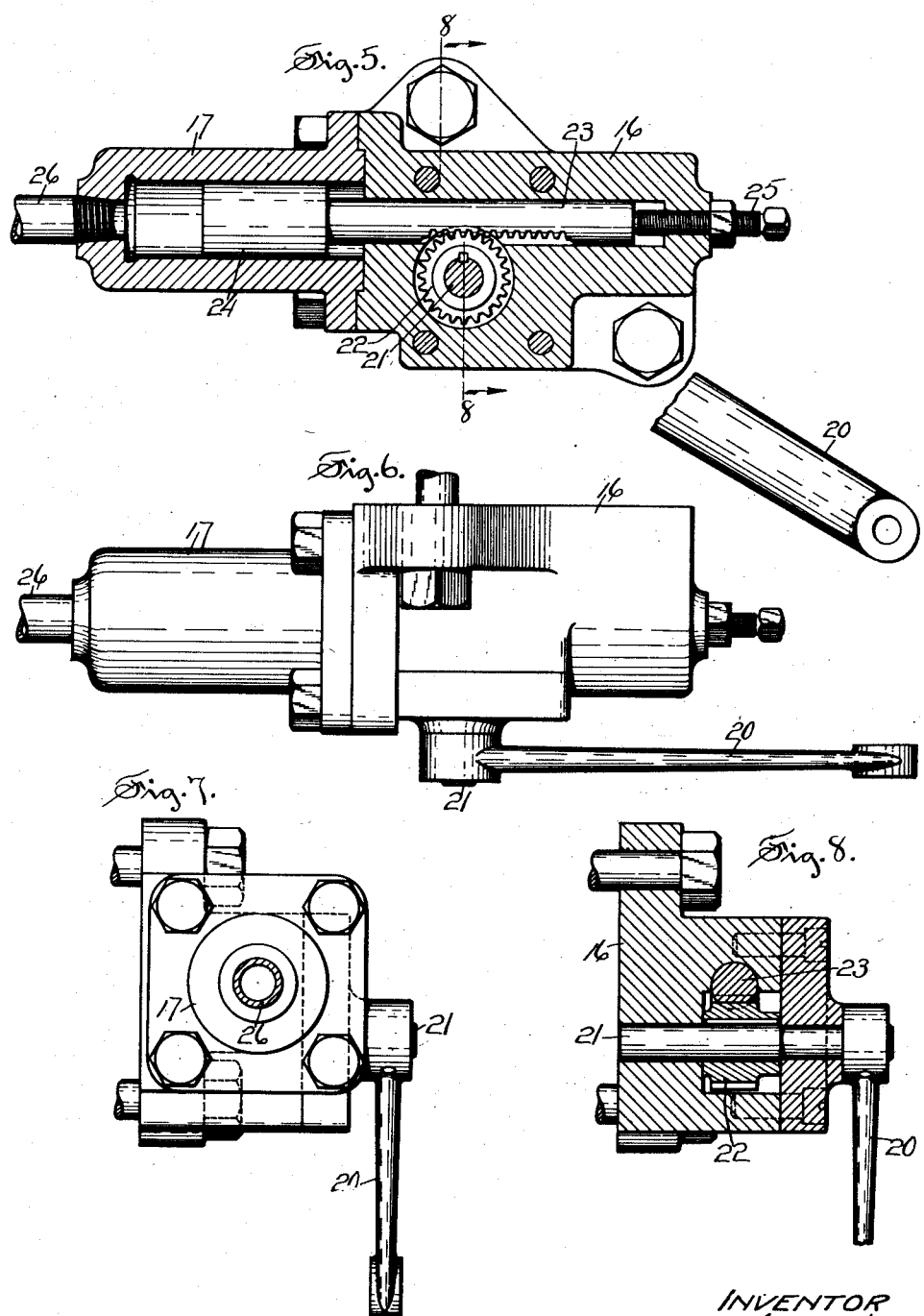

Patented Apr. 24, 1934

1,956,096

UNITED STATES PATENT OFFICE 1,956,096

WEIGHING DEVICE FOR VEHICLES

Percy B. Goodale, Newington, Conn.

Application August 10, 1929, Serial No. 384,931

2 Claims. (Cl. 265—40)

My invention relates more particularly to that class of vehicles that are employed for transporting heavy loads, and an object of my invention, among others, is to so equip a vehicle of this class that the weight of the load may be readily determined, as it is being loaded; and a further object of the invention is to provide a vehicle, so equipped, with means for permitting its use without operation of the weighing device.

One form of a structure embodying my invention, and in the construction and use of which the objects herein set out, as well as others, may be attained, is illustrated in the accompanying drawings, in which—

Figure 1 is a side view of a portion of the truck chassis illustrating the application of my improved device thereto.

Figure 2 is a plan view, scale reduced, of a truck chassis equipped with my improved device.

Figure 3 is a detail view, scale enlarged, illustrating the indicator.

Figure 4 is a detail view, scale reduced, from Figure 3 but enlarged over Figures 1 and 2, in lengthwise central section through the actuating pump.

Figure 5 is a detail view to the same scale as Figure 3, of one of the weight indicator actuating units in central lengthwise section.

Figure 6 is a top view of the same.

Figure 7 is an end view.

Figure 8 is a view in section on a plane denoted by the dotted line 8—8 of Figure 5.

In the accompanying drawings the numeral 10 denotes the side bars of the frame of a vehicle chassis, 11 the supporting wheels, 12 the engine, and 13 the differential, only enough of the members of the vehicle being specifically referred to to give a general knowledge of the structure. My weight or load determining device comprises units acting in connection with the springs 14 supported upon the axles 15 in the usual manner.

The apparatus comprises a weight indicator actuating unit located at each point of support of the chassis by a spring, and as these units are all of the same construction, a description of one will suffice for a clear understanding of the invention. Each of these units comprises a case 16 and a cylinder 17, the latter preferably secured to the case as by means of bolts. This case is secured to some portion of the frame or load receiving part of the vehicle, in the present instance, it being shown as secured to a side bar 10. In any event, it is so positioned that the end of an actuating bar 18 may be seated in a recess in a block 19 supported in the present instance, on top of the spring over the axle, and as shown in Figure 1 of the drawings, but it will be understood that this block or its equivalent may be supported on any part of the running gear which includes the springs and that part of the vehicle between which and the chassis the springs are located. The end of the bar 18 opposite its seating end is pivotally connected to an actuating lever 20 secured to a shaft 21, rotatably mounted in the case 16, and having secured thereto within the case a pinion 22, the teeth of which mesh with a rack bar 23 reciprocatingly mounted in the case 16. This bar has formed at one end, or secured thereto, a piston or displacing member 24 located in the cylinder 17. An adjusting screw 25 extends through the end of the case to contact with and determine the position of the rack bar and hence of the piston or displacing member when the free end of the actuating bar 18 is initially seated in the recess in the block 19.

Each of the cylinders 17 has connected for supply of a fluid thereto a pipe 26 forming a part of a pressure system composed of pipes interconnected and also connected with an actuating pump. In the structure herein shown pipes 27 extend lengthwise of the vehicle on opposite sides thereof, preferably inside the bars 10, connecting the weight indicator actuating units on each side of the chassis frame, and these two pipes are connected by a cross pipe 28. The pipe 28 is connected by a pipe 29 with one end of the actuating pump supported in any desired position by the chassis, preferably adjacent to the engine.

This pump comprises a pressure cylinder 30 having a pressure piston 31 located therein. The pump also comprises an actuating cylinder 32 having an actuating piston 33 therein. A connecting rod 34 secured at its opposite ends to said pistons extends through a bearing in a partition 35 separating the chambers located in each end of the cylinder. The pipe 29 communicates with the chamber in the cylinder 30 and two pipes 36—37 communicate with the chamber in the cylinder 32 on opposite sides of the piston 33, the pipes 36—37 being joined by a valve 38 from which a pipe 39 extends to a suction device which, in the present instance, is the intake manifold 40 of the engine. The valve 38 is of any ordinary construction to cause the suction of the manifold 40 to be exerted on either side of the piston 33, and while such manifold is made use of in the device as herein illustrated and described, it will be obvious that any other means for producing a vacuum on either side of the piston 33, or for otherwise actuating the piston 33, may be employed.

The piston 31 is used to fill the system with oil or other fluid, and my invention contemplates other means for supplying the system with such fluid and I do not, therefore, wish to limit the invention to the means illustrated and described herein, such means being employed merely for the purpose of illustration.

An indicator 41 is connected with the system to indicate the degree of movement of one or more of the levers 20, in the particular apparatus herein shown, this indicator being connected with the pipe 28 as by a pipe 42 to receive pressure therefrom. This indicator comprises a cylinder 43 having a piston 44 therein backed up by a spring 45, the piston having a rack bar 46, the teeth of which mesh with a pinion 47 secured to the arbor of an indicating hand 48 operating in connection with graduations on a dial 49.

In the operation of the device, the chamber in the cylinder 30 being supplied with a fluid, oil or glycerine having been found satisfactory, and the pipes of the system containing such liquid, to put the apparatus into operation the engine is started and the valve 38 is turned to permit the suction of the manifold 40 to be exerted through the pipe 36 on the piston 33. This will move said piston and the piston 31 and create pressure in the system, thereby causing the liquid in the system to act upon the pistons 24 and effect movement of said pistons to actuate the levers 20 and thereby seat the ends of the bars 28 in the blocks 19, it being understood that before this operation, said bars were positioned out of contact with said blocks. As each of the bars is seated in its block, and there is, therefore, resistance to further movement of the bars, the tension of the spring 45 in the indicator 41 will be overcome and the piston 44 will be forced inwardly thereby moving the hand 48 to the zero point. As soon as the hand reaches the zero point, a valve 50 in the pipe 29 is turned to shut off the action of the piston 31 on the system, and the valve 38 may also be turned to shut off the action of the manifold on the piston 33. The vehicle is now ready to receive its load. The adjusting screw will have been set to stop movement of the rack bar 23.

As the vehicle is loaded the chassis will settle under the weight thereby causing the levers 20 to be moved upwardly. This will cause a movement of the pistons 24 in their several cylinders to produce a pressure therein which will extend into the system and hence to the indicator 41, the hand of which will be moved by such pressure. The graduations on the dial 49 will have been primarily determined, as by tests, so that the movements of the levers 20 to a certain degree will cause the hand 48 to point to a certain graduation, the movements of the levers 20 to such degree being determined by the amount of load upon the vehicle. This position of the levers 20 is indicated approximately by the dotted outline next above the intermediate line position shown in Figure 1. An important feature of this invention resides in the fact that when the amount of load has been determined, the apparatus may be so set that the action of the vehicle springs in the travel of the vehicle will not be transmitted in any way to the load determining system. To this end, when the load has been determined, the valve 38 is turned to permit action of the manifold 40 through the pipe 37 to the chamber in the piston 32. The suction thereby created will cause the piston 33 to travel in the reverse direction to that hereinbefore described when the system was being "set" to receive the load. This will cause the operation of the piston 31 to relieve the pressure in the system by removing a portion of the fluid therefrom, and the levers 20 will be raised as shown by the dotted outline in the upper portion of Figure 1 of the drawings.

In accordance with the provisions of the patent statutes, I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A load indicator for vehicles including a plurality of weight indicator actuating units carried by the vehicle spring supported chassis, said units each including a movably mounted member adapted to be seated against a member of the running gear of the vehicle and a displacing member operatively connected with said movably mounted member, a system of tubes connecting said units and adapted to receive a fluid whereby the effect of movement of one of said displacing members will be communicated to the other units, an indicator, means connecting said indicator with said system to denote different degrees of movement of each of said members under deflection of the vehicle chassis toward the axle assembly in proportion to the load thereon, a cylinder connected with said tube system and containing a piston to force said fluid into each of said units, means for causing movement of said piston in opposite directions, and means for shutting off the action of said piston from said system during a measuring operation.

2. A load receiving member, a spring supported member, a connection between said members, said connection including a plurality of units each of which comprises a movable member operatively connected with the load receiving member to respond to the amount of movement thereof in proportion to the load in a movement of the load receiving member toward the spring supporting member, pressure producing means operatively connected with said movable member, means operatively connected with said movable member for positively fixing the starting position of said movable member, means forming communication between the several units whereby the movement of the load receiving member toward the spring supporting member in one unit will be communicated to the other unit, and means operatively connected with said communicating means for indicating an increase in weight upon the load receiving member.

PERCY B. GOODALE.